10

(12) United States Patent
Javaid et al.

(10) Patent No.: US 8,477,625 B2
(45) Date of Patent: Jul. 2, 2013

(54) METHOD, DEVICE AND SYSTEM FOR SELECTING A WIRELESS ACCESS NETWORK ON THE BASIS OF ENVIRONMENT INFORMATION, COMPUTER PROGRAM AND CORRESPONDING DATA SUPPORT

(75) Inventors: Usman Javaid, Newbury (GB); Djamal-Eddine Meddour, Lannion (FR); Toufik Ahmed, Talence (FR)

(73) Assignee: France Telecom, Paris (FR)

( * ) Notice: Subject to any disclaimer, the term of this patent is extended or adjusted under 35 U.S.C. 154(b) by 603 days.

(21) Appl. No.: 12/373,284

(22) PCT Filed: Jul. 6, 2007

(86) PCT No.: PCT/FR2007/051613
§ 371 (c)(1),
(2), (4) Date: Apr. 16, 2009

(87) PCT Pub. No.: WO2008/007005
PCT Pub. Date: Jan. 17, 2008

(65) Prior Publication Data
US 2009/0316669 A1 Dec. 24, 2009

(30) Foreign Application Priority Data
Jul. 10, 2006 (FR) ...................................... 06 06275

(51) Int. Cl.
*G01R 31/08* (2006.01)

(52) U.S. Cl.
USPC ........................................... 370/236; 370/420

(58) Field of Classification Search
USPC ......................................... 370/328, 236, 420
See application file for complete search history.

(56) References Cited

U.S. PATENT DOCUMENTS

| 2005/0013275 | A1* | 1/2005 | Black et al. | 370/329 |
| 2005/0083899 | A1* | 4/2005 | Babbar et al. | 370/342 |
| 2006/0029003 | A1 | 2/2006 | Hassan et al. | |

FOREIGN PATENT DOCUMENTS

| GB | 2 398 705 | 8/2004 |
| WO | WO 2005/064957 | 7/2005 |

* cited by examiner

*Primary Examiner* — Sai-Ming Chan
(74) *Attorney, Agent, or Firm* — Knobbe Martens Olson & Bear LLP

(57) ABSTRACT

The method of selecting a wireless access telecommunication network in a global link between a first terminal (18) and a second terminal (12) comprises the steps of furnishing context information related to a set of at least one terminal (12, 18) called context taken from the first and second terminals, and in determining the network selected from context information from the set of context terminals (12, 18) by following a set of predetermined rules. The context information of at least one reference terminal taken in the set of context terminals includes information related to a local environment of the at least one reference terminal (12) and the determination of the selected network depends on information related to the local environment of the at least one reference terminal (12).

12 Claims, 5 Drawing Sheets

US 8,477,625 B2

METHOD, DEVICE AND SYSTEM FOR SELECTING A WIRELESS ACCESS NETWORK ON THE BASIS OF ENVIRONMENT INFORMATION, COMPUTER PROGRAM AND CORRESPONDING DATA SUPPORT

This application is a 35 U.S.C. §371 National Stage entry of International Patent Application No. PCT/FR2007/051613, filed on Jul. 6, 2007, and claims priority to French Application No. FR 0606275, filed on Jul. 10, 2006, both of which are hereby incorporated by reference in their entireties.

BACKGROUND OF THE INVENTION

The present invention relates to a method for selecting a telecommunications network from a heterogeneous set of wireless access networks forming an infrastructure capable of providing an overall link between a first terminal and a second terminal.

The current development of telecommunications systems tends towards an increasing convergence of multimedia services, accompanied by a diversified access with high mobility and wide geographical coverage.

This is demonstrated by the rapid growth in the production of mobile terminals with various data processing capacities, transmission ranges and multiple functions, such as for example personal digital assistants (PDA), personal mobile phones and portable computers, as well as the emergence of new wireless network access technologies such as in particular Wi-Fi, WiMax, UMTS and DVB-H.

Within the framework of an application supported by a telecommunications link between a first terminal and a second terminal, it is known to select a transport or carrier network of the application while taking into account global criteria relating to the link in its entirety.

It is also known when taking into account the overall link for network selection to consider the contextual information associated with the operator's network management policy, the expected quality of service according to the chosen network, the contextual information associated with the individual data processing and transmission capacity of the first and second terminals or with the user profile which sets predetermined subjective user criteria.

During the selection of a network, it can occur that the terminal network infrastructure access resources are limited or even unsuitable in relation to the contextual information described and itemized above.

A need therefore exists for adaptation of the network infrastructure access resources of at least one terminal to the application and the link desired by users.

SUMMARY OF THE INVENTION

The invention meets this need by providing network infrastructure access resources suitable for the application and the link desired by the source terminal and/or the destination terminal.

To this end, the invention relates to a method for selecting a wireless telecommunications network for terminals, characterized in that the context information of at least one reference terminal taken from the set of context terminals comprises information relating to a local environment of the at least one reference terminal, the local environment of the at least one reference terminal being a set of terminals effectively connected to the at least one reference terminal independently of the infrastructure, and in that determining the chosen network depends on the information relating to the local environment of the at least one reference terminal.

A terminal effectively connected to a reference terminal is a live terminal in service condition and having an operational communications link with the reference terminal. The terminal is connected to the reference terminal independently of the infrastructure when the operational link with the reference terminal does not comprise any partial or total link forming part of the infrastructure. Therefore it is permitted to use the connected terminal infrastructure communication resources in addition or as an alternative to the reference terminal's own resources.

According to particular embodiments, the method comprises one or more of the following characteristics, taken singly or in all technically feasible combinations:

the information relating to the local environment of said at least one reference terminal comprises a set of effective network access connections associated with at least certain terminals of the local environment of the reference terminal, an effective network access connection being a connection to an active terminal of the local environment of the reference terminal or to a network node of the infrastructure;

an active terminal is a live terminal in service condition. The information relating to the local environment makes it possible to exhaustively define the options for connection of the reference terminal to the infrastructure.

the information relating to the local environment of said at least one reference terminal comprises a set of data processing capacities associated with at least certain terminals of the local environment of the reference terminal;

thus, the transmission limitations inherent in the connected terminals of the local environment are known and can be taken into account.

the supply of information relating to the local environment is carried out by each reference terminal;

thus, the management of the local environment information is distributed on each terminal and does not require the use of a complex server.

the supply of information relating to the local environment is performed by a central database grouping together for a set of terminals, the information data relating to the local environment of the terminals in their entirety;

thus, deploying local environment information is quicker and does not require a prior link between terminals to be established.

the method comprises the step consisting of preparing the information relating to the local environment of each reference terminal comprising the steps consisting of:

building a so-called direct list of the terminals and the infrastructure network nodes connected effectively and directly to the reference terminal, collecting the associated environmental information for each terminal connected effectively and directly to the reference terminal;

the terminals or nodes effectively connected in the sense defined above are also connected to the reference terminal when the connecting link is a simple wired or wireless connection not involving any intermediate terminal or node. Thus, the preparing the information relating to the local environment allows the information which is ready for use to be rapidly made available.

determining the chosen network depends on information from at least one category of the set of categories constituted for each context terminal by a user profile giving varied criteria for acceptance of the service provision associated with an application,
a usage profile,
a profile of the desired types of cover,
calculated carrying capacities and reception quality associated with a network option,
operator profile information taking into account its infrastructure capacity and its charging policy;
thus, the criterion for determining the chosen network is a combination of local environment information and other information.
the set of the at least one reference terminal contains a single element.

It is not necessary to have local environment information available from an overall link for both of the terminals at once, since in certain applications such as in particular the transfer of a large file, only that of the destination terminal may be required.

The invention also relates to a telecommunications system implementing the method for selecting a wireless telecommunications network for terminals, characterized in that it comprises means of implementing the defined method, as defined above.

The invention also relates to a computer program comprising program code instructions for executing the steps of the selection method as described above, when said program is executed on a computer.

The invention also relates to a data support comprising computer instructions making it possible to implement steps of the method for selecting a wireless telecommunications network for terminals, characterized in that it comprises instructions which, when executed by a computer, implement the method as defined above.

The invention also relates to a device for selecting a wireless access telecommunications network for terminals from a set of at least two wireless access telecommunications networks forming an infrastructure of networks, capable of providing an overall link between a first terminal and a second terminal comprising:
  means of supplying contextual information, arranged to supply context information relating to a set of at least one terminal called a context terminal;
  means of determining a wireless access telecommunications network, arranged in order to determine a network from context information by following a set of predetermined rules,
  characterized in that, the context information of at least one reference terminal taken from the set of context terminals comprising information relating to a local environment of the at least one reference terminal, the local environment of the at least one reference terminal being a set of terminals effectively connected to the at least one reference terminal independently of the infrastructure, the means of determining the network are moreover arranged in order to determine the network according to the information relating to the local environment of the at least one reference terminal.

In a particular embodiment, the device comprises moreover means of preparing the local environment information associated with the device.

BRIEF DESCRIPTION OF THE DRAWINGS

The invention will be better understood on reading the following description, given by way of example only with reference to the attached drawings, in which.

DESCRIPTION OF THE PREFERRED EMBODIMENTS

Figure 1:
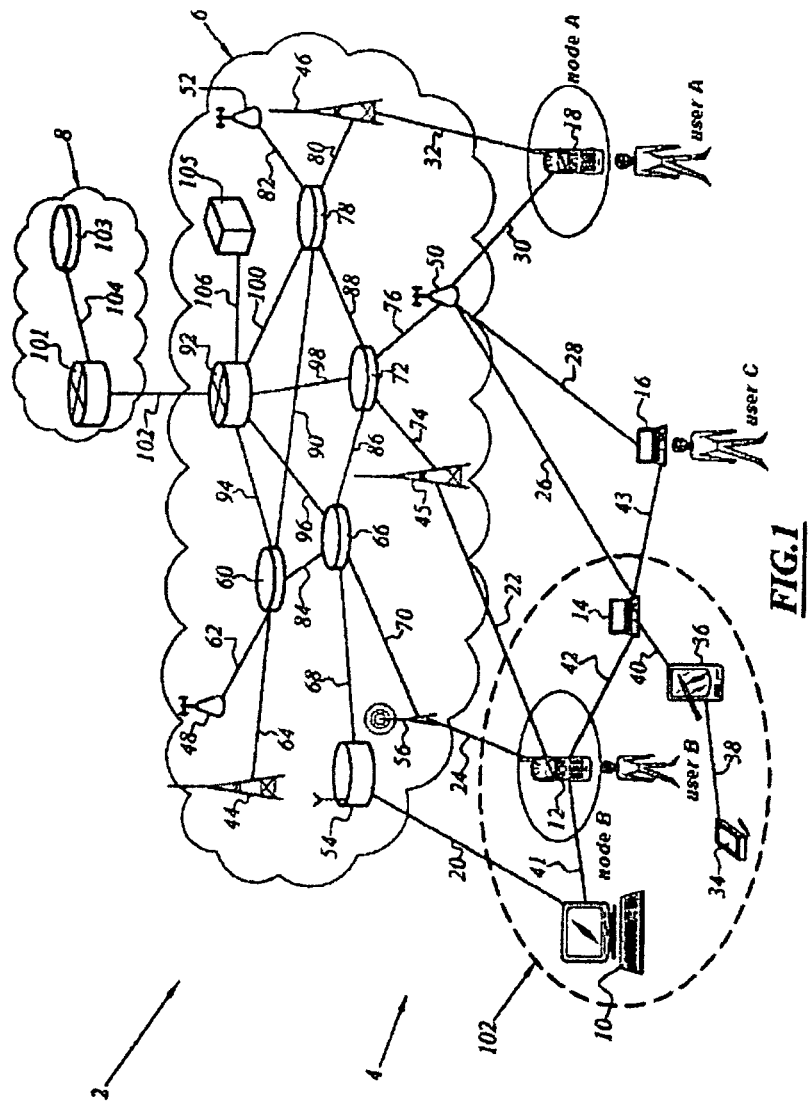
FIG. 1 is a view of an example telecommunications system architecture implementing the method according to the invention.

FIG. 1 illustrates a heterogeneous telecommunications system 2 comprising at least two separate networks using different wireless access technologies for terminals.

Telecommunications system 2 comprises a set of 4 of terminals, a set 6 of at least two separate networks forming an infrastructure 6 of networks, and a control network 8 of the infrastructure 6 associated with an operator.

The set of terminals 4 comprises various terminals capable of being multimode, multifunctional, mobile or not, and having several interfaces for access to different networks. In other words, the terminals can use one or more wireless network interfaces as desired, such as for example an interface of the WiFi type or an interface of UMTS type.

A first group of terminals, here numbering five, comprises terminals 10, 12, 14, 16 and 18 having at least one direct access to the infrastructure 6.

Terminal 10 is a static office computer connected to a network of the xDSL (digital subscriber line) type of the infrastructure 6 by a wireless interface link 20 of xDSL type.

Terminal 12 is a personal mobile telephone terminal suitable for connection to a wide area network of UMTS (Universal Mobile Telecommunications System) type of the infrastructure 6 by a UMTS interface link 22 or to a television TV broadcast type network or DVB-H (digital video broadcast) type by a DVB-H interface access link 24.

Terminal 14 is a portable computer 14 capable of being connected to the infrastructure 6 by an interface link 26 of long range Wi-Fi type.

Terminal 16 is also a portable computer capable of being connected to the infrastructure 6 by an interface link 28 of long range Wi-Fi type.

Terminal 18 is a personal mobile telephone capable of being connected as desired to the infrastructure 6 by an interface link 32 of UMTS type or a link 30 of long range Wi-Fi type.

In FIG. 1, terminal 18 belongs to a user A while terminal 16 belongs to a user C. The set of terminals 10, 12 and 14 belongs to a user B.

A second group of terminals comprises terminals 34 and 36 connected to the infrastructure 6 of networks by means of a terminal of the first group.

The terminal 34 is a tablet PC (portable computer) linked to the terminal 36 by an interface link 38 of Bluetooth type. The terminal 36 is a personal digital assistant (PDA) linked to the portable computer 14 by means of an interface link 40 of the Bluetooth type. The terminals 34 and 36 are connected to the infrastructure 6 of networks through the terminal 14.

Terminals of the first group are also linked locally to each other. The static computer 10 is connected to the terminal 12 by an interface link 41 of infrared type and the terminal 14 is linked to the terminal 12 by an interface link 42 of the local short range Wi-Fi type called ad-hoc Wi-Fi. The portable terminals 14 and 16 are linked to each other by a link 43 of the ad-hoc Wi-Fi type.

The infrastructure 6 comprises a certain number of nodes, each being attached to a type of network.

The infrastructure 6 comprises nodes belonging to the UMTS type network, three nodes 44, 45 and 46 being represented on FIG. 1. The node 45 is a UMTS access station connected to the terminal 12 by the link 24 while the node 46 is a UMTS access station connected to the terminal 18 by the link 24.

The network infrastructure 6 also comprises a set of nodes attached to the Wi-Fi type network, here represented in FIG. 1 as three in number, 48, 50 and 52. The node 50 of the Wi-Fi network is connected to the terminal 14 by the link 26, to the terminal 16 by the link 28 and to the terminal 18 by the link 30.

The infrastructure 6 also comprises a broadband server 54 connected to the terminal 10 by the wireless link 20 and a video broadcast station 56 connected to the mobile telephone mobile 12 by the link 22.

The different networks of the network infrastructure 6 are mutually interconnected by an internet-type high-level integration network.

A first integrated router 60, encapsulating the low-level network layers according to the internet protocol is connected to the Wi-Fi node 48 and to the UMTS node 44. A second integration router 66 is connected to the access node server 54 and to the television broadcast node 56. A third integration router 72 is connected to the UMTS node 45 and to the Wi-Fi node 50. A fourth integration router 78 is connected to the Wi-Fi node 52 and to the UMTS node 46.

The routers 60, 66, 72 and 78 are mutually interconnected according to an internet protocol by links 84, 86, 88 and 90 and controlled by a control station 92 of the networks infrastructure 6. The control station 92 accesses the routers 60, 66, 72 and 78 through the respective links 94, 96, 98 and 100. The control station 92 of the infrastructure 6 is itself controlled by administration centres associated with the operators, a single administration centre having the reference 101 being represented here in FIG. 1. The administration centre 101 is connected to other integrated network infrastructures, including one via an external router 103 which is connected to it by a link 104.

The infrastructure 6 comprises a central database 105, called the local environment database, connected to the control station 92 of the infrastructure by a data link 106. The central database is capable of receiving data from the set of terminals via the infrastructure 6.

The user B here has available several terminals 10, 12, 14, 34 and 36, offering him identical or complementary services of different types as well as several options for connecting to a terminal belonging to another user, A or C for example. The terminals of the user B are connected to the infrastructure 6 directly by themselves or indirectly by other mutually connected terminals and using their multiple available interfaces.

Generally, a local environment of a terminal called a reference terminal is defined as the set of the terminals effectively connected to the reference terminal independently of the infrastructure 6 of networks. In FIG. 1, the local environment of the terminal 12 taken as a reference and which can be considered as a terminal node of the infrastructure 6, called node B, is constituted by the terminals 10, 14, 34 and 36. The local environment of the terminal 12 is here limited to the terminals belonging to the user B.

As a variant, the local environment of the reference terminal can be extended to a terminal belonging to another user, for example the terminal 16 belonging to the user C, on condition, however, that a data exchange authorization has been agreed by the two users B and C according to a predetermined protocol between terminals, here the terminals 14 and 16.

As a local environment is associated with a reference terminal, information relating to the local environment is defined as being a set of data processing capacities and effective network access connections associated with each terminal of the local environment and the reference terminal, an effective network access connection being a link to an active local environment terminal or an infrastructure network.

By way of example, the local environment of the mobile terminal 12 belonging to the user B and forming a terminal node B for the infrastructure 6 is described in the form of a Table 1 containing the local environment information and constituting in itself the local environment information entity of the terminal 12, here taken as reference terminal. The first column gives the reference numbers which according to FIG. 1 are associated with the local environment terminals, namely 10, 14, 36, 34 as well as the number of the reference terminal, here terminal 12. The second column describes the type of terminal corresponding to each terminal such as for example static computer, portable computer, mobile telephone, personal assistant (PDA) or tablet PC. The third column describes the data processing capacities associated with each terminal, such as for example the computation power of the central processing unit (CPU), the types of peripherals supported and their interfaces (in particular GUI (graphical user interface), high-resolution screen, sound interface), the characteristics of functionalities such as the mobility and power supply autonomy. The fourth column describes the effective network access connections associated with each terminal in the form of an interface/identifier pair of the local environment terminal connected to the interface or infrastructure identifier.

TABLE 1

| Terminal number on FIG. 1 | Type of terminal | Data processing capacity | Network connectivity |
|---|---|---|---|
| 12 | Mobile telephone | Limited CPU capacity GUI Limited power supply High mobility | 6 - UMTS 6 - DVB - H 14 - Ad hoc Wi-Fi 10 - Infrared |
| 10 | Static computer | High CPU capacity High screen resolution Peripheral sound Unlimited power supply | 6 - DSL 12 - Infrared |
| 14 | Portable computer | High CPU capacity High resolution screen Peripheral sound Limited power supply | 6 - Wi-Fi 16 - Ad hoc Wi-Fi 36 - Bluetooth 12 - Ad hoc Wi-Fi |

TABLE 1-continued

| Terminal number on FIG. 1 | Type of terminal | Data processing capacity | Network connectivity |
|---|---|---|---|
| 36 | Personal assistant (PDA) | Limited CPU capacity GUI Limited power supply High mobility | 14 - Bluetooth 34 - Bluetooth |
| 34 | Tablet PC | Limited CPU capacity GUI Limited power supply High mobility | 36 - Bluetooth |

Figure 2:
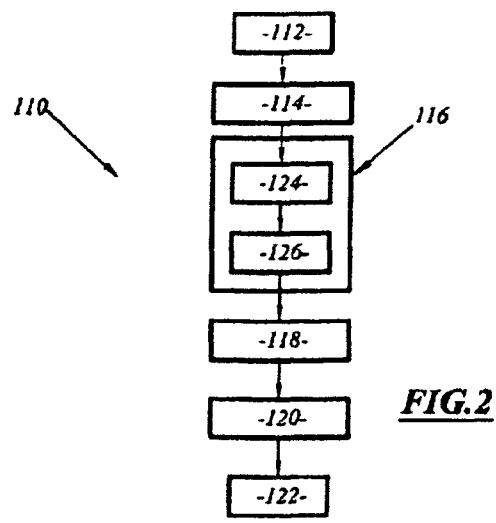
FIG. 2 is a flowchart of an embodiment of the method according to the invention.

FIG. 2 represents a sequence 110 of steps of the method of selecting a network from the set of networks forming the network infrastructure 6.

In a first step 112 the selection method is activated. In a following preparation step 114, the information relating to the local environment of the reference terminal is prepared. Then follows a step 116 of acquisition of the information relating to the local environment of the reference terminal by a terminal other than the reference terminal or an infrastructure node.

In a following step 118, the acquired local environment information of the reference terminal is processed. Then, in step 120, the network is selected on the basis of the local environment information of the reference terminal and other types of information. Step 122 marks the end of the network selection method.

The step of acquisition 116 of the information relating to the local environment of the reference terminal comprises a first step 124 of transmitting an acquisition request by a terminal other than the reference terminal or a node of the infrastructure 6, which is followed on reply by a step of supplying 126 the local environment information relating to the reference terminal.

Figure 3:
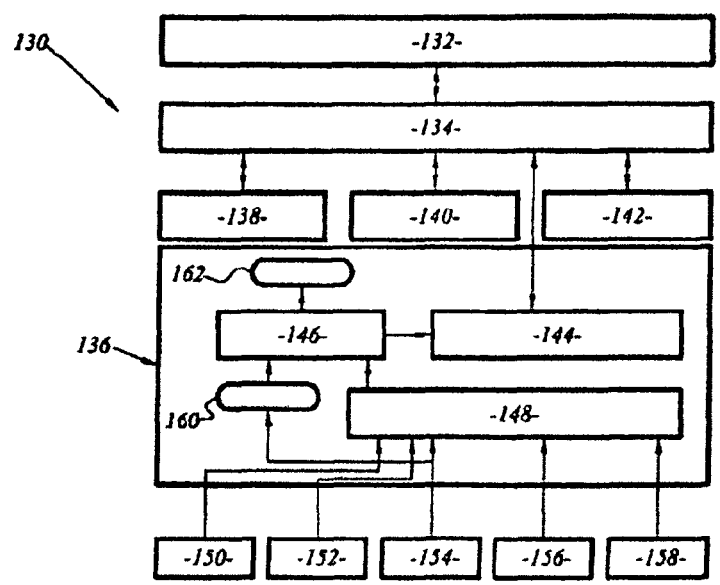
FIG. 3 is a function chart of the units implementing the invention at the level of a generic reference terminal.

FIG. 3 represents an embodiment of the functional architecture of a generic terminal 130 organized according to an ISO-type layer model and implementing the method of the invention.

The terminal 130 comprises means of processing service applications 132, means of determining a network 134 of the infrastructure and means of preparing 136 environment information associated with the generic terminal.

The means of determining a network 134 are capable of receiving information data originating from means of supply of operator profile 138 information, means of supply of service quality information calculated for the overall link 140 and means of supply of contextual information 142 relating to another terminal and means of local supply 144 of the local environment of the terminal. The means of determining a network 134 are arranged in order to determine a network from the context information by following a set of predetermined rules. They are moreover arranged to determine the network according to the information relating to the local environment, the local environment of the other terminal being a set of terminals effectively connected to the other terminal independently of the infrastructure.

The means 134, 138, 140 and 142 are here all localized at the level of the reference terminal 130.

As a variant, the functional units 134, 138, 140 and 142 are fully or partially localized at the level of the infrastructure 6, for example at the level of the integration router, at the level of a network access station or also at the level of another terminal, different from the reference terminal in question.

The means of preparation 136 of environmental information associated with the generic reference terminal 130 comprise means of local supply 144, a means of local storage 146 of the local environment information and means of scanning 148 a set of network access interfaces 150, 152, 154, 156 and 158, available on the reference terminal 130.

The local supply means 144 are capable of receiving the local environment information relating to the reference terminal, originating from the local storage means 146.

The local storage means 146 are capable of recording the information relating to a list of the terminals called a direct list and the infrastructure network nodes which are connected effectively and directly to the reference terminal 130. The direct list is obtained by the set of means 148, 150, 152, 154, 156, 158, 160 which form a unit for building the direct list.

The scanning means 148 are associated with means of activation of the interfaces and interface configuration learning means which are not shown in FIG. 3.

The set of network access interfaces available on the scanned reference terminal 130 comprise a type 802.11 interface 150, a Bluetooth type interface 152, an infrared type interface 154, a DVB-H type interface 156, and a UMTS type interface 158.

The local storage means 146 are also capable of recording local environment information, called derived information, associated with each terminal of the direct list and obtained by collection means 160 forming part of the preparation means 134.

The collection means 160 are capable of collecting the environment information, for example in the form of Daemon type tables for each interconnected interface. Here, in FIG. 3 only the interface 154 is interconnected.

The local environment information stored in the local database 146 can be updated cyclically or when an event is triggered by a coordination unit of the preparation means 136, not shown in FIG. 3.

Updates of the information contained in the local databases 146 can be sent to the central database 105, such as here for example by a refresh signal transmission unit 162.

Thus, the architecture of the reference terminal 130 of FIG. 3 allows the local environment information associated with the reference terminal to be supplied as desired from a central database 105 or from the reference terminal itself.

Figure 4:
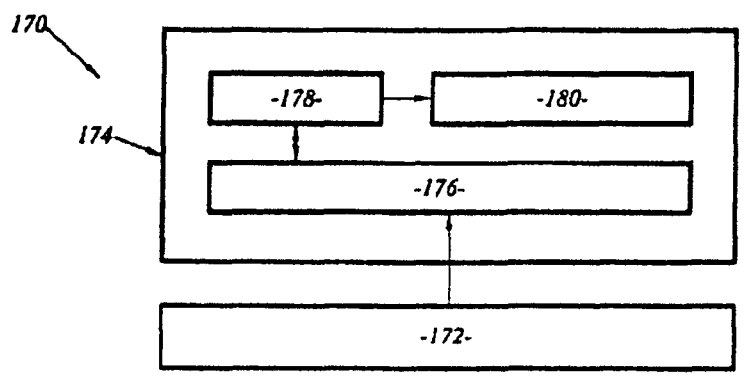
FIG. 4 is a function chart of the units implementing the invention at the level of a generic central database containing the local environment information.

FIG. 4 represents an embodiment of the functional architecture of a generic central database 170 organized according to an ISO-type layer model and contributing to the implementation of a particular embodiment of the method of the invention.

The central database 170 comprises access means 172 to the internet integration network, and a control unit 174 of the environment information of the terminals.

The control unit 174 of the environment information of the terminals comprises a central collection unit 176 for the environment information originating from different terminals and a centralized storage unit 178 for the local environment information of the terminals.

The control unit 174 also comprises a distribution module 180 capable of distributing the local environment information associated with each terminal registered in the central database 170 at the request of any terminal.

Figure 5:
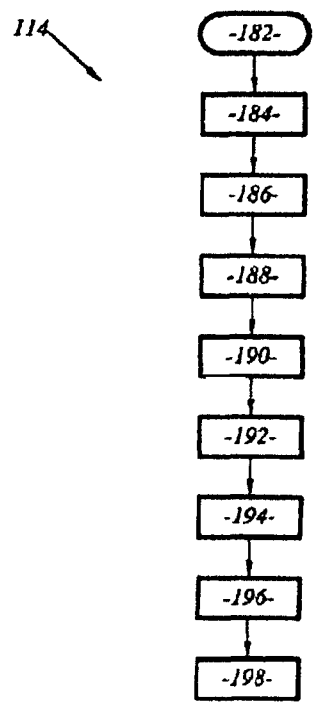
FIG. 5 is a detailed flowchart of the step of preparing the information relating to the local environment of a reference terminal.

FIG. 5 represents a sequence of the steps of the preparation procedure 114. After a first step 182 of starting a reference terminal, a step of scanning 184 the set of the available network access interfaces on the reference terminal then follows. In a subsequent activation step 186, the interfaces associated with the reference terminal are activated. In a step 188 the available interfaces are detected and in a following step 190, connecting the interfaces which are currently capable of being connected to the network is carried out. In a following step 192, the direct list relating to the direct accesses from the reference terminal is built. In a following step 194, for each terminal effectively connected directly to the reference terminal, the associated local environment information is collected, for example in the form of a Daemon type table. The local environment information of the terminal which is the subject of the collection comprises information relating to other terminals connected to the latter. Thus, on completion of the step 194, the local environment information of the reference terminal comprises environment information from terminals effectively connected directly or indirectly. In a following step 196, the local environment information collected is stored in the local database of the local environment of the reference terminal. In the following step 198, the data from the local database of the reference terminal are sent to the central database 105 in order to allow it to be updated.

Figure 6:
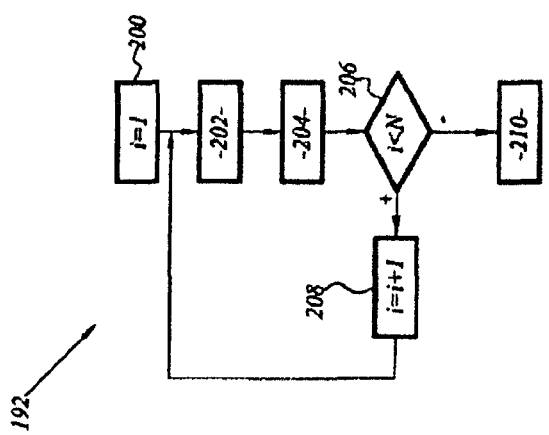
FIG. 6 is a flowchart of the step of building the list of the terminals and network nodes of the infrastructure effectively and directly connected to the reference terminal.

FIG. 6 represents a sequence of the procedure 192 for building the direct list of the terminals attached directly and effectively to the reference terminal 130. A running-index interface counter i is initialized to 1 in a step 200. In a following step 202, the activation status of the row i interface within terminal 130 is checked and in the case where the row i interface is active, the information for detecting a direct link with the connected terminal identifier is posted in the direct list of the reference terminal. Then in a step 206, a comparison is carried out between the current value of the counter i and the total number of interfaces N to be scanned. In the case where interfaces remain to be scanned, in a step 208, the interface counter i is incremented by one unit and the sequence of steps 202, 204, 206 is repeated. In the case where the comparison indicates that the total number of interfaces N for scanning has been reached, in a step 210 the sequence of the procedure 192 is declared complete.

Figure 7:
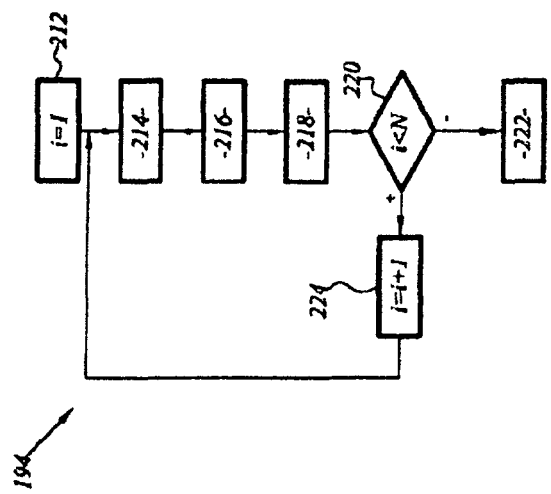
FIG. 7 is a detailed flowchart of the step of collecting the local environment information associated with a terminal effectively connected directly to the reference terminal.

FIG. 7 represents a sequence of the procedure 194 for collection of the local environment information from the terminals directly attached to the reference terminal 130. In a first step 212, the standard index counter i pointing respectively to the interface of row i is initialized to 1. At the following step 214 according to the activation status of the row i interface listed in the direct list, it is requested in a step 216 to collect the environment table associated with the terminal connected by the row i interface and listed in the list. After receipt of the local environment table of the terminal connected directly and effectively, the local database is updated in a step 218. In a subsequent step 220, a comparison is carried out between i and the total number N of the available interfaces on the reference terminal. In the case where i is strictly less than N, in a step 224, the interface counter i is incremented by one unit and the sequence of steps 214, 216, 218, 220 is repeated. In the case where the comparison indicates that all the interfaces have been scanned, the sequence of the procedure 194 is declared complete in a step 226.

Figure 8:
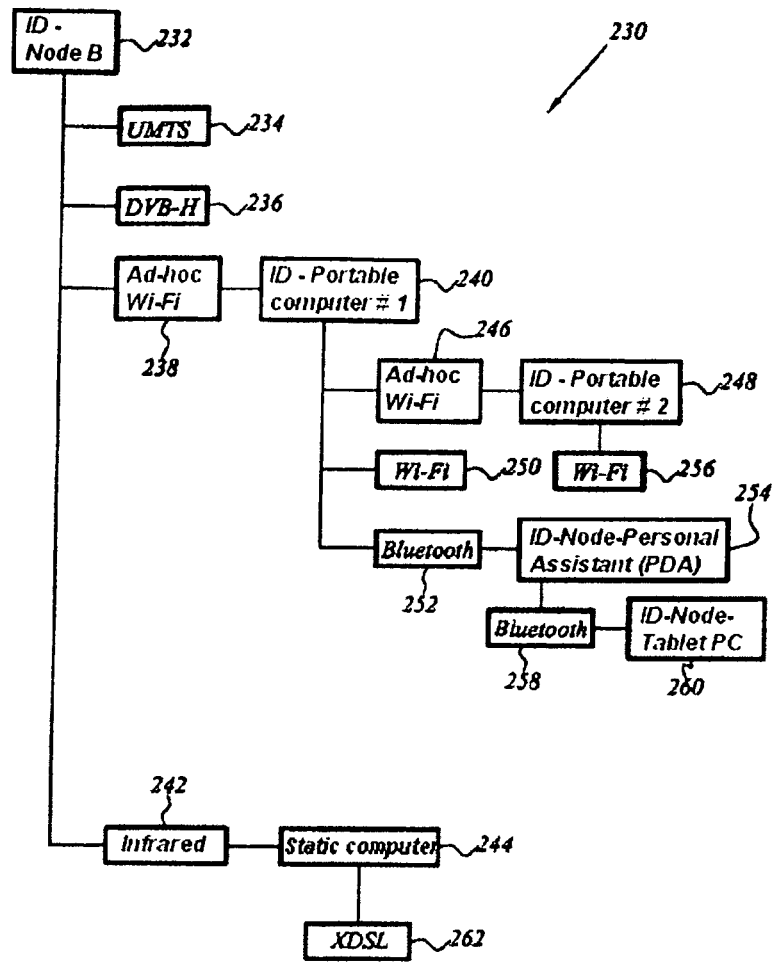
FIG. 8 is a view in tree structure format of the information relating to the local environment of the reference terminal.

FIG. 8 illustrates a message format supplied on completion of the step 126 of supply of the local environment information relating to the reference terminal in the particular case of a supply of the information relating to the local environment of the terminal 12, shown in the configuration of FIG. 1. Following a tree structure, the message comprises at the top of the tree a field 232 containing the identifier of the node of terminal 12, here node B.

Fields containing the codes of the available interfaces of terminal 12 are derived from the field 232, namely a first field 234 containing the interface code "UMTS", a second field 236 containing the interface code "DVB-H", a third field 238 containing the interface code "ad-hoc Wi-Fi" associated with a field 240 containing the connected terminal code, here "portable computer #1" and its network identifier, and a fourth field 242 containing the interface code "infrared" associated with a field 244 indicating "static computer". When an interface field is not associated with a connection terminal field, this means that the interface is connected to a node of the infrastructure 6.

A set of three interface fields is derived from the field 240. A first field 246 containing the "ad hoc Wi-Fi" code is associated with a terminal field 248 containing "portable computer" with its ID identifier number. A second field 250 contains the "Wi-Fi" code. A third field 252 containing the "Bluetooth" code is associated with a terminal field 254 containing "personal digital assistant (PDA)" with its identifier number. An interface field 256 containing "Wi-Fi" is derived from the field 248. An interface field 258 containing "Bluetooth" associated with a field 260 of terminal 24 containing "tablet PC" with its identifier, is derived from the terminal field 254. An interface field 262 containing "xDSL" is derived from the field of terminal 242.

Thus the connectivity set of the local environment associated with terminal 12 is represented. This representation appears here as a summary of the local environment of the terminal 12 described in Table 1, the network connectivity information being essentially represented. Numerous variants of the format for presentation of the local environment information integrate the local environment information as described in Table 1 to different extents and use a standard database management programming language.

An example scenario of terminal-to-terminal telecommunications illustrating advantages of the network selection method using information relating to the local environment of a reference terminal is described below.

The architecture of the telecommunications system considered for this scenario is the architecture described in FIG. 1. In this example, the method is implemented within the framework of a call from terminal 18, acting as a calling terminal node A and source for sending a 10 Megabits file to the terminal node B, i.e. the terminal 12 acting as called terminal and recipient of the file. The local environment information available in the central database 105 of the infrastructure 6 is described in the form of a Table 2 below.

TABLE 2

| Terminal number | Type of terminal | Data processing capacity | Network connectivity |
| --- | --- | --- | --- |
| 18 (node A) | Mobile telephone | Limited CPU capacity GUI Limited power supply High mobility | UMTS (direct) Wi-Fi (direct) |
| 12 (node B) | Mobile telephone | Limited CPU capacity GUI Limited power supply High mobility | UMTS (direct) DVBH (direct) Wi-Fi (via 14[Wi-Fi]) XDSL (via 10 [Infrared]) |

The node A sends an acquisition request for local environment information from terminal 12 to the central database 105 in order to obtain at least the local environment information of the destination terminal node B. The central database 105 sends the local environment information relating to the terminal 12 as described in table 2, to the node A. After acquisition of the local environment information relating to terminal 12, the node A is then able to decide on the selection of the network which will allow it to optimizer a certain number of criteria relating to the overall link.

An example of the criteria is provided here by way of example consisting of deciding that if the source node 18 has a Wi-Fi interface and the destination node has a Wi-Fi interface and the application in progress is a file transfer, the network selected is the Wi-Fi type network.

The scenario described above using a selection based on the local environment information has the advantages detailed below.

In the case where a selection is not carried out by a method based on the local environment, the selection process would have been the following. Terminal 18 uses a UMTS network of the infrastructure 6 which accesses terminal 12. As the two nodes each have an access to a UMTS network, with standard procedures they would choose a UMTS type network for file transfer. The choice made following a standard method has the drawback that the throughput offered by the UMTS network is much lower than that of a Wi-Fi network. Consequently, the duration of the file transfer can be very long. Moreover, the cost of using a UMTS network is based on a packet rate, while Wi-Fi is free of charge or simply has a minimal rate for a monthly subscription. The result is that the cost of a terminal-to-terminal path on a UMTS network is higher than that for the use of a Wi-Fi type network.

The Wi-Fi network is suitable for data file transfers while the UMTS network is more suitable in the case of a telephonic data transfer. Thus selecting UMTS for a 10-Megabit file transfer does not allow an optimized management of the network resources to be achieved.

In the absence of a method based on the local environment of the reference terminal 12, here a destination terminal, the selection process is semi-blind and unaware of the local availabilities around the destination terminal.

The method for selecting a network based on the local environment of a destination terminal thus offers greater connectivity for a mobile, thus making it possible to optimize the selection criteria even further according to service qualities and the balance of rates over a heterogeneous set of networks.

This increase in connectivity can also be exploited for a large number of services offered for terminal-to-terminal link configurations and varying traffic, by integrating the mobility function of the terminals therein.

The invention claimed is:

1. A method implemented in an infrastructure of networks for selecting a wireless access telecommunications network for terminals from a set of at least two wireless access telecommunications networks forming an infrastructure of networks, the method comprising, for establishing a link between a first terminal and a second terminal:
   supplying context information relating to a set of at least one context terminal taken from the first and second terminals,
   selecting a chosen network among said set of at least two wireless access telecommunications networks, from the context information of the set of context terminals by following a predetermined set of rules,
   the context information of at least one reference terminal taken from the set of context terminals comprising information relating to a local environment of the at least one reference terminal,
   the local environment of the at least one reference terminal being a set of terminals effectively connected to the at least one reference terminal independently of the infrastructure, and
   said selecting the chosen network depending on the information relating to the local environment of the at least one reference terminal, and
   providing an overall link between said first and second terminals, by using said chosen network.

2. The method for selecting a network according to claim 1, wherein the information relating to the local environment of said at least one reference terminal comprises a set of effective network access connections associated with at least certain terminals of the local environment of the reference terminal, an effective network access connection being a link to an active terminal of the local environment of the reference terminal or to a network node of the infrastructure.

3. The method for selecting a network according to claim 2, wherein the information relating to the local environment of said at least one reference terminal comprises a set of information processing capacities associated with at least certain terminals of the local environment of the reference terminal.

4. The method for selecting a network according to claim 1, wherein the supply of the information relating to the local environment is carried out by each reference terminal.

5. The method for selecting a network according to claim 1, wherein supply of the local environment information is carried out by a central database containing for a set of terminals, the information data relating to the local environment of all the terminals.

6. The method for selecting a network according to claim 1, comprising the step preparing the information relating to the local environment of each reference terminal and comprising the steps of:
   building a list called a direct list of the network nodes and terminals of the infrastructure effectively and directly connected to the reference terminal,
   collecting the associated local environment information for each terminal effectively and directly connected to the reference terminal.

7. The method for selecting a network according to claim 1, wherein determining the chosen network depends on information from at least one category from the set of the categories constituted for each context terminal by
   a user profile indicating criteria for acceptance of the supply of service associated with an application,
   a usage profile,
   a profile of the types of cover desired,
   calculated carrying capacities and reception quality associated with a network option,
   operator profile information taking into account its infrastructure capacity and its charging policy.

8. The method for selecting a network according to claim 1, wherein the set of the at least one reference terminal contains a single element.

9. A telecommunication system comprising
   at least two terminals,
   a set of at least two wireless access telecommunications networks forming an infrastructure of networks capable of providing an overall link between a first terminal and a second terminal,
   wherein said telecommunication system is configured to:
   supply context information relating to a set of at least one context terminal taken from the first and second terminals,
   select a chosen network among said set of at least two wireless access telecommunications networks, from the context information of the set of context terminals by following a predetermined set of rules, wherein the context information of at least one reference terminal is taken from the set of context terminals comprising information relating to a local environment of the at least one reference terminal, wherein the local environment of the at least one reference terminal is a set of terminals effectively connected to the at least one reference terminal independently of the infrastructure, and wherein said selecting the chosen network depends on the information relating to the local environment of the at least one reference terminal, and provide an overall link between said first and second terminals, by using said chosen network.

10. A non-transitory computer readable medium comprising program code instructions for the execution of a method on a computer, wherein said method is utilized in a telecommunications system comprising at least two terminals and a set of at least two wireless access telecommunications networks forming an infrastructure of networks capable of providing an overall link between a first terminal and a second terminal and wherein said method comprises:

supplying context information relating to a set of at least one context terminal taken from the first and second terminals, selecting a chosen network among said set of at least two wireless access telecommunications networks, from the context information of the set of context terminals by following a predetermined set of rules, the context information of at least one reference terminal taken from the set of context terminals comprising information relating to a local environment of the at least one reference terminal, the local environment of the at least one reference terminal being a set of terminals effectively connected to the at least one reference terminal independently of the infrastructure, and said selecting the chosen network depending on the information relating to the local environment of the at least one reference terminal, and providing an overall link between said first and second terminals, by using said chosen network.

11. A device for selecting a wireless access telecommunications network for terminals from a set of at least two wireless access telecommunications networks forming an infrastructure of networks, the device comprising, for providing a link between a first terminal and a second terminal:

means of supplying contextual information, arranged to supply context information relating to a set of at least one context terminal;

means of selecting a chosen wireless access telecommunications network, arranged to determine a network among said at least two wireless access telecommunications networks, from the context information by following a set of predetermined rules, the context information of at least one reference terminal taken from the set of context terminals comprising information relating to a local environment of the at least one reference terminal, the local environment of the at least one reference terminal being a set of terminals effectively connected to the at least one reference terminal independently of the infrastructure, the means of determining the network being moreover arranged in order to determine the chosen network according to the information relating to the local environment of the at least one reference terminal, the chosen network providing an overall link between said first and second terminals.

12. The device according to claim 11, further comprising means of preparing the local environment information associated with the device.

* * * * *

UNITED STATES PATENT AND TRADEMARK OFFICE
CERTIFICATE OF CORRECTION

PATENT NO.       : 8,477,625 B2                                                                  Page 1 of 1
APPLICATION NO.  : 12/373284
DATED            : July 2, 2013
INVENTOR(S)      : Javaid et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 819 days.

Signed and Sealed this
Eighth Day of September, 2015

Michelle K. Lee
*Director of the United States Patent and Trademark Office*